US012752481B2

(12) United States Patent
Wittkopf et al.

(10) Patent No.: US 12,752,481 B2
(45) Date of Patent: Oct. 6, 2026

(54) THREE-DIMENSIONAL PRINTING WITH MICROBE-INHIBITING AGENTS

(71) Applicant: PERIDOT PRINT LLC, Palo Alto, CA (US)

(72) Inventors: Jarrid Alexander Wittkopf, Palo Alto, CA (US); Kristopher J Erickson, Palo Alto, CA (US); Emre Hiro Discekici, San Diego, CA (US); Sterling Chaffins, Corvallis, OR (US); Kevin P DeKam, Corvallis, OR (US); Raghuvir N Sengupta, Palo Alto, CA (US); Albert Liu, Palo Alto, CA (US); Elizabeth Galati, Palo Alto, CA (US)

(73) Assignee: Peridot Print LLC, Palo Alto, CA (US)

(*) Notice: Subject to any disclaimer, the term of this patent is extended or adjusted under 35 U.S.C. 154(b) by 107 days.

(21) Appl. No.: 18/033,542

(22) PCT Filed: Oct. 30, 2020

(86) PCT No.: PCT/US2020/058080

§ 371 (c)(1),
(2) Date: Apr. 24, 2023

(87) PCT Pub. No.: WO2022/093251

PCT Pub. Date: May 5, 2022

(65) Prior Publication Data

US 2023/0398732 A1 Dec. 14, 2023

(51) Int. Cl.
*B29C 64/165* (2017.01)
*B33Y 10/00* (2015.01)
(Continued)

(52) U.S. Cl.
CPC ............ *B29C 64/165* (2017.08); *B33Y 10/00* (2014.12); *B33Y 30/00* (2014.12); *B33Y 70/10* (2020.01); *B33Y 80/00* (2014.12)

(58) Field of Classification Search
CPC .............................. B28B 1/001; B29C 64/165
See application file for complete search history.

(56) References Cited

U.S. PATENT DOCUMENTS

| | | | |
|---|---|---|---|
| 9,863,065 | B2 | 1/2018 | Farrugia et al. |
| 10,034,478 | B2 | 7/2018 | Krasnow et al. |

(Continued)

FOREIGN PATENT DOCUMENTS

| | | | | |
|---|---|---|---|---|
| CN | 106589408 | A | * | 4/2017 |
| CN | 109045364 | A | | 12/2018 |

(Continued)

*Primary Examiner* — Susan D Leong
*Assistant Examiner* — Vipul Malik
(74) *Attorney, Agent, or Firm* — Dierker & Kavanaugh, P.C.

(57) ABSTRACT

The present disclosure describes materials, methods, and systems for three-dimensional printing. In one example, a three-dimensional printing kit can include a fusing agent and a microbe-inhibiting agent. The fusing agent can include water and an electromagnetic radiation absorber. The electromagnetic radiation absorber can absorb radiation and convert the radiation energy to heat. The microbe-inhibiting agent can include a liquid vehicle and a metal bis(dithiolene) complex. The disclosure also describes methods of three-dimensional printing that utilize a metal-containing microbe-inhibiting material, which can be a metal bis(dithiolene) complex or other materials.

11 Claims, 4 Drawing Sheets

(51) Int. Cl.

| | |
|---|---|
| ***B33Y 70/10*** | (2020.01) |
| *B33Y 30/00* | (2015.01) |
| *B33Y 80/00* | (2015.01) |

(56) References Cited

U.S. PATENT DOCUMENTS

| | | | | |
|---|---|---|---|---|
| 2015/0072066 | A1* | 3/2015 | Karandikar | D06M 16/00 427/352 |
| 2016/0326337 | A1 | 11/2016 | Farrugia et al. | |
| 2019/0077080 | A1 | 3/2019 | Zhao et al. | |
| 2019/0092799 | A1 | 3/2019 | Olubummo et al. | |
| 2019/0382429 | A1 | 12/2019 | Olubummo et al. | |

FOREIGN PATENT DOCUMENTS

| | | | | |
|---|---|---|---|---|
| JP | 2016-210967 | A | 12/2016 | |
| WO | WO-2018080436 | A1 * | 5/2018 | B22F 1/10 |
| WO | 2018/144033 | A1 | 8/2018 | |
| WO | WO-2018194542 | A1 * | 10/2018 | B29C 64/165 |
| WO | 2019/017926 | A1 | 1/2019 | |
| WO | 2019/108273 | A1 | 6/2019 | |
| WO | WO-2019156656 | A1 * | 8/2019 | C09D 11/322 |
| WO | WO-2019246251 | A2 * | 12/2019 | B22F 10/00 |
| WO | 2020/086074 | A1 | 4/2020 | |

* cited by examiner

THREE-DIMENSIONAL PRINTING WITH MICROBE-INHIBITING AGENTS

BACKGROUND

Methods of three-dimensional (3D) digital printing, a type of additive manufacturing, have continued to be developed over the last few decades. However, systems for three-dimensional printing have historically been very expensive, though those expenses have been coming down to more affordable levels recently. Three-dimensional printing technology can shorten the product development cycle by allowing rapid creation of prototype models for reviewing and testing. Unfortunately, the concept has been somewhat limited with respect to commercial production capabilities because the range of materials used in three-dimensional printing is likewise limited. Accordingly, it can be difficult to three-dimensionally print functional parts with properties such as good mechanical strength, dimensional accuracy, visual appearance, durability and so on. Nevertheless, several commercial sectors such as aviation and the medical industry have benefitted from the ability to rapidly prototype and customize parts for customers.

DETAILED DESCRIPTION

Figure 1:
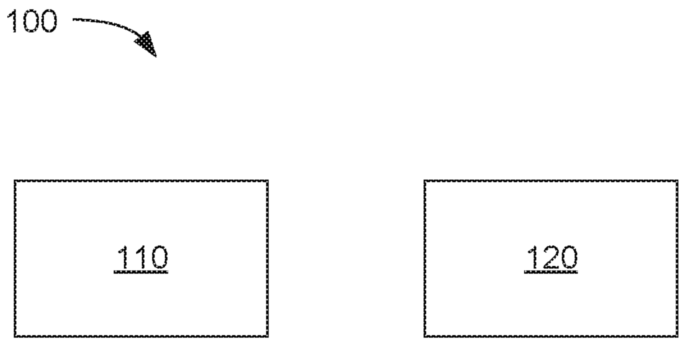
FIG. 1 is a schematic diagram of an example three-dimensional printing kit in accordance with examples of the present disclosure.

The present disclosure describes three-dimensional printing kits, methods, and systems that utilized microbe-inhibiting agents. In one example, a three-dimensional printing kit includes a fusing agent and a microbe-inhibiting agent. The fusing agent includes water and an electromagnetic radiation absorber. The electromagnetic radiation absorber absorbs radiation and converts the radiation energy to heat. The microbe-inhibiting agent includes a liquid vehicle and a metal bis(dithiolene) complex. In some examples, the radiation absorber can be carbon black, a near-infrared absorbing dye, a near-infrared absorbing pigment, a tungsten bronze, a molybdenum bronze, a conjugated polymer, or a combination thereof. In further examples, the metal of the metal bis(dithiolene) complex can be nickel, zinc, platinum, palladium, or molybdenum. In other examples, the three-dimensional printing kit can also include a particulate build material that includes polymer particles. In certain examples, the polymer particles can include polyamide-6, polyamide-9, polyamide-11, polyamide-12, polyamide-6,6, polyamide-6,12, thermoplastic polyamide, polyamide copolymer, polyethylene, thermoplastic polyurethane, polypropylene, polyester, polycarbonate, polyether ketone, polyacrylate, polystyrene, polyvinylidene fluoride, polyvinylidene fluoride copolymer, poly(vinylidene fluoride-trifluoroethylene), poly(vinylidene fluoride-trifluoroethylene-chlorotrifluoroethylene), wax, or a combination thereof.

The present disclosure also describes methods of making three-dimensional printed objects having anti-microbial properties. In one example, a method of making a three-dimensional printed object having anti-microbial properties includes iteratively applying individual particulate build material layers to a powder bed. The particulate build material includes polymer particles. A fusing agent is selectively applied, based on a three-dimensional object model, onto the individual particulate build material layers. The fusing agent includes water and an electromagnetic radiation absorber. A metal-containing microbe-inhibiting material is also selectively applied, based on the three-dimensional object model, onto the individual build material layers in a sufficient amount to form an area having inhibited microbe growth. The powder bed is exposed to energy to selectively fuse the polymer particles in contact with the electromagnetic radiation absorber to form a fused polymer matrix at individual build material layers. In various examples, the metal-containing microbe-inhibiting material can be included in the fusing agent or the metal-containing microbe-inhibiting material can be included in a separate microbe-inhibiting agent that is applied to the particulate build material layers. In some examples, the amount of the metal-containing microbe-inhibiting material introduced to the particulate build material layers can be insufficient to make the three-dimensional printed object electrically conductive. In certain examples, the amount of the metal-containing microbe-inhibiting material introduced to the particulate build material can be from about 0.01 vol % to about 9 vol % with respect to the combined volume of the metal-containing microbe-inhibiting material and the particulate build material at the area. In further examples, having inhibited microbe growth can include slowing microbe growth, preventing microbe growth, killing microbes present on the three-dimensional printed object, or a combination thereof. In certain specific examples, the metal-containing microbe-inhibiting material can include silver particles, copper particles, zinc particles, nickel particles, a metal bis(dithiolene) complex, or a combination thereof, and the metal of the metal bis(dithiolene) complex can be nickel, zinc, platinum, palladium, or molybdenum. In some examples, the area having inhibited microbe growth can be a portion of a surface of the final three-dimensional printed object, and the three-dimensional printed object can also include a remainder of the surface that is devoid of the metal-containing microbe-inhibiting material. The present disclosure also extends to three-dimensional printed objects made by the above methods.

The present disclosure also describes three-dimensional printing systems. In one example, a three-dimensional printing system includes a particulate build material, a fusing agent applicator, a microbe-inhibiting agent applicator, a radiant energy source, and a hardware controller. The particulate build material includes polymer particles. The fusing agent applicator is fluidly coupled or coupleable to a fusing agent. The fusing agent applicator is directable to iteratively apply the fusing agent to layers of the particulate build material. The fusing agent includes water and an electromagnetic radiation absorber. The electromagnetic radiation absorber absorbs radiation and converts the radiation energy to heat. The microbe-inhibiting agent applicator is fluidly coupled or coupleable to a microbe-inhibiting agent. The microbe-inhibiting agent applicator is directable to iteratively apply the microbe-inhibiting agent to layers of the particulate build material. The microbe-inhibiting agent includes a metal-containing microbe-inhibiting material. The radiant energy source is positioned to expose the layers of powder bed material to radiation energy to selectively fuse the particulate build material in contact with the electromagnetic radiation absorber and thereby form a three-dimensional printed object. The hardware controller is in communication with the microbe-inhibiting agent applicator and programmed to direct the microbe-inhibiting agent applicator to apply the microbe-inhibiting agent onto the particulate build material in a sufficient amount to form an area having inhibited microbe growth. In some examples, the metal-containing microbe-inhibiting material can include silver particles, copper particles, zinc particles, nickel particles, a metal bis(dithiolene) complex, or a combination thereof and the metal of the metal bis(dithiolene) complex can be nickel, zinc, platinum, palladium, or molybdenum.

When discussing the three-dimensional printing kits, methods of making three-dimensional printed objects, and three-dimensional printing systems described herein, these discussions can be considered applicable to one another whether or not they are explicitly discussed in the context of that example. Thus, for example, when discussing a polymeric build material related to a three-dimensional printing kit, such disclosure is also relevant to and directly supported in the context of the methods of making three-dimensional printed objects, and vice versa.

Terms used herein will have the ordinary meaning in their technical field unless specified otherwise. In some instances, there are terms defined more specifically throughout the specification or included at the end of the present specification, and thus, these terms can have a meaning as described herein.

Three-Dimensional Printing Kits

The materials described above can be collected in the form of a three-dimensional printing kit. Such three-dimensional printing kits can also be used with the methods and systems described herein to make three-dimensional printed objects having anti-microbial properties. The fusing agent, microbe-inhibiting agent, particulate build material, and other materials described herein can be used in a particular type of three-dimensional printing process that involves fusing layers of polymer particles together. In one example of this printing process, a thin layer of polymer powder is spread on a bed to form a powder bed. A fluid ejector, such as a fluid jet print head, is then used to apply a fusing agent over portions of the powder bed corresponding to a thin layer of the three dimensional object to be formed. Then the bed can be exposed to a light source, e.g., typically the entire bed. The fusing agent can absorb more energy from the light than the powder where fusing agent was not applied. The absorbed light energy is converted to thermal energy, causing the powder to melt and coalesce forming a solid layer. After the first layer is formed, a new thin layer of polymer powder is spread over the powder bed and the process is repeated to form additional layers until a complete three-dimensional object is printed. Such three-dimensional printing processes can achieve fast throughput with good accuracy.

In the particular processes described herein, a microbe-inhibiting material can be used. As explained in more detail below, in some examples the microbe-inhibiting material can be an ingredient in the fusing agent, while in other examples the microbe-inhibiting material can be in a separate microbe-inhibiting agent. In certain examples, a microbe-inhibiting agent can be selectively applied to certain areas of the powder bed during three-dimensional printing. These areas of the powder bed can then be fused to form portions of the final three-dimensional printed object. When a sufficient amount of the microbe-inhibiting material is applied, these areas can have inhibited microbe-growth. Inhibiting microbe growth can include any type of inhibition of the growth of microbes compared to the growth rate of microbes on the three-dimensional printed object when the microbe-inhibiting material is absent. For example, the microbe-inhibiting material can slow the growth of microbes on the three-dimensional printed object, or the microbe-inhibiting material can prevent the growth of microbes, or the microbe-inhibiting material can actively kill microbes that are present so that the number of microbes decreases over time. Selectively applying the microbe-inhibiting agent can allow for the formation of specific regions on the final three-dimensional printed object that have these microbe-inhibiting properties.

In some examples, the three-dimensional printing methods and materials described herein can be more useful compared to other methods of making objects with anti-microbial properties. One alternative method of making an object with anti-microbial properties includes mixing a polymer with an anti-microbial material and injection molding an object using the polymer mixture. This allows for the entire molded object to have anti-microbial properties, but does not allow for discrete regions of the object to have anti-microbial properties. Another alternative method includes applying an anti-microbial coating to an object. Such coatings can be selectively applied to specific areas by masking. However, masking can be difficult for complex geometries and in some cases certain areas of an object may be impossible to mask or apply a coating. Coatings can also have a higher likelihood of removal through wear compared to a microbe-inhibiting material that is embedded in fused polymer as in the methods described herein. The methods described herein can be used to create durable objects having microbe-inhibiting properties, where the microbe-inhibiting effect can be selectively imparted to specific areas of the object regardless of geometry, and where the microbe-inhibiting effect is not diminished by wear.

The materials and methods described herein can be useful for making three-dimensional printed objects for any application in which bacterial growth or other microbe growth is of concern. Bacteria growth on surfaces can lead to health and safety concerns, odors, fouling of fluid lines, and so on. As an example, in the medical and dental field there are many devices for contacting the human body. Keeping these devices clean and free of bacteria growth can avoid issues with infection. In other examples, wearable items such as prosthetics, shoes, insoles, and others can have anti-microbial properties to help reduce odors caused by bacteria growth.

With this description in mind, FIG. 1 is a schematic diagram of an example three-dimensional printing kit 100 in accordance with examples of the present disclosure. The three-dimensional printing kit includes a fusing agent 110 and a microbe-inhibiting agent 120. The fusing agent can include water and an electromagnetic radiation absorber. The electromagnetic radiation absorber can absorb radiation and convert the radiation energy to heat. The microbe-inhibiting agent can include a liquid vehicle and a metal bis(dithiolene) complex. The metal bis(dithiolene) complex can act as a microbe-inhibiting material.

Figure 2:
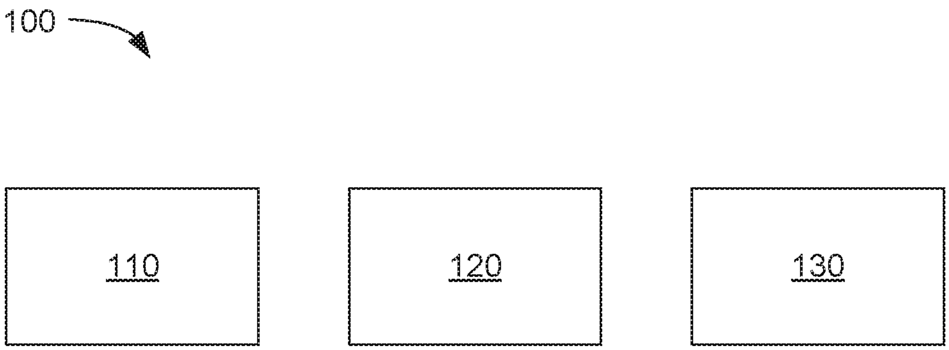
FIG. 2 is a schematic diagram of another example three-dimensional printing kit in accordance with examples of the present disclosure.

In further examples, the three-dimensional printing kit can also include a particulate build material. FIG. 2 is a schematic diagram of another example three-dimensional printing kit 100 in accordance with examples of the present disclosure. This example includes a fusing agent 110 and a microbe-inhibiting agent 120 as in the previous examples. This kit also includes a particulate build material 130. The particulate build material can include polymer particles.

In certain examples, the radiation absorber in the fusing agent can include carbon black, a near-infrared absorbing dye, a near-infrared absorbing pigment, a tungsten bronze, a molybdenum bronze, a conjugated polymer, or a combination thereof. Further details about the composition of fusing agents are disclosed below.

In other examples, the metal bis(dithiolene) complex can include a metal atom such as nickel, zinc, platinum, palladium, molybdenum, or others. Further details about the metal bis(dithiolene) complex and other ingredients of the microbe-inhibiting agent are also disclosed below.

In further examples, the polymer particles of the particular build material can include polyamide-6, polyamide-9, polyamide-11, polyamide-12, polyamide-6,6, polyamide-6,12, thermoplastic polyamide, polyamide copolymer, polyethylene, thermoplastic polyurethane, polypropylene, polyester, polycarbonate, polyether ketone, polyacrylate, polystyrene, polyvinylidene fluoride, polyvinylidene fluoride copolymer, poly(vinylidene fluoride-trifluoroethylene), poly(vinylidene fluoride-trifluoroethylene-chlorotrifluoroethylene), wax, or a combination thereof. Again, further details about the particulate build material are disclosed below.

Methods of Making Three-Dimensional Printed Objects Having Anti-Microbial Properties The present disclosure also describes methods of making three-dimensional printed objects having anti-microbial properties. In some examples, the methods can utilize the materials of the three-dimensional printing kits described above. In further examples, alternative materials can be used. In various examples, these methods can include applying a metal-containing microbe-inhibiting material to a particulate build material to form areas of the three-dimensional printed object having inhibited microbe growth. In certain examples, the metal-containing microbe-inhibiting material can be a metal bis(dithiolene) complex as described above. In other examples, the metal-containing microbe-inhibiting material can include metal particles, such as silver particles, copper particles, zinc particles, or nickel particles. Furthermore, the metal-containing microbe-inhibiting material can be included in a fusing agent that is applied to particulate build material that is to be fused together, or the metal-containing microbe-inhibiting material can be included in a separate microbe-inhibiting agent that is used together with the fusing agent. Therefore, a variety of metal-containing microbe-inhibiting materials can be used to make three-dimensional printed objects that have microbe-inhibiting properties throughout the entire object or selectively in certain parts of the object.

Figure 3:
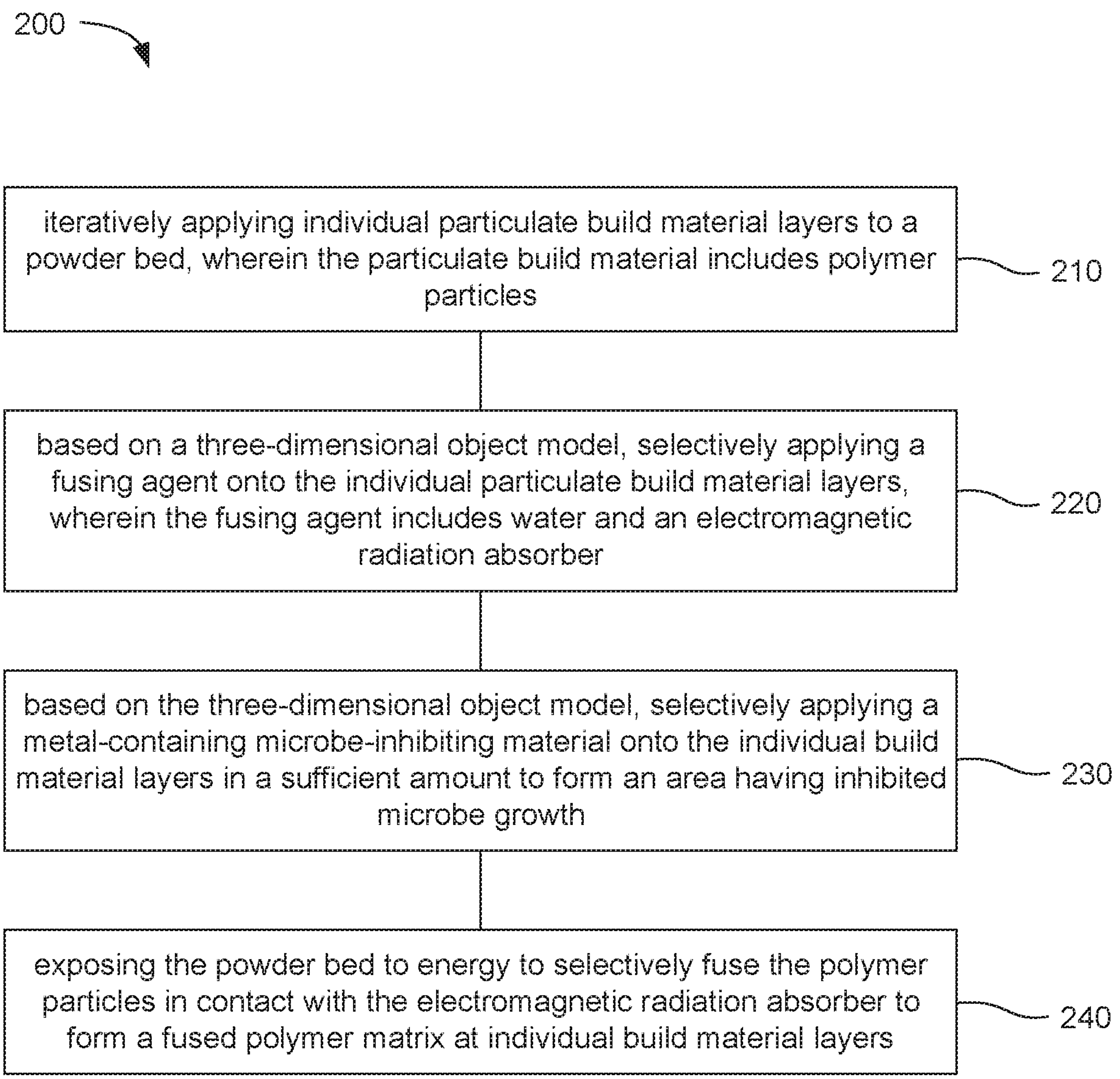
FIG. 3 is a flowchart illustrating an example method of making a three-dimensional printed object having anti-microbial properties in accordance with examples of the present disclosure.

FIG. 3 is a flowchart illustrating an example method 200 of making a three-dimensional printed object having anti-microbial properties. The method includes: iteratively applying individual particulate build material layers to a powder bed, wherein the particulate build material includes polymer particles 210; based on a three-dimensional object model, selectively applying a fusing agent onto the individual particulate build material layers, wherein the fusing agent includes water and an electromagnetic radiation absorber 220; based on the three-dimensional object model, selectively applying a metal-containing microbe-inhibiting material onto the individual build material layers in a sufficient amount to form an area having inhibited microbe growth 230; and exposing the powder bed to energy to selectively fuse the polymer particles in contact with the electromagnetic radiation absorber to form a fused polymer matrix at individual build material layers 240.

Figure 4A:
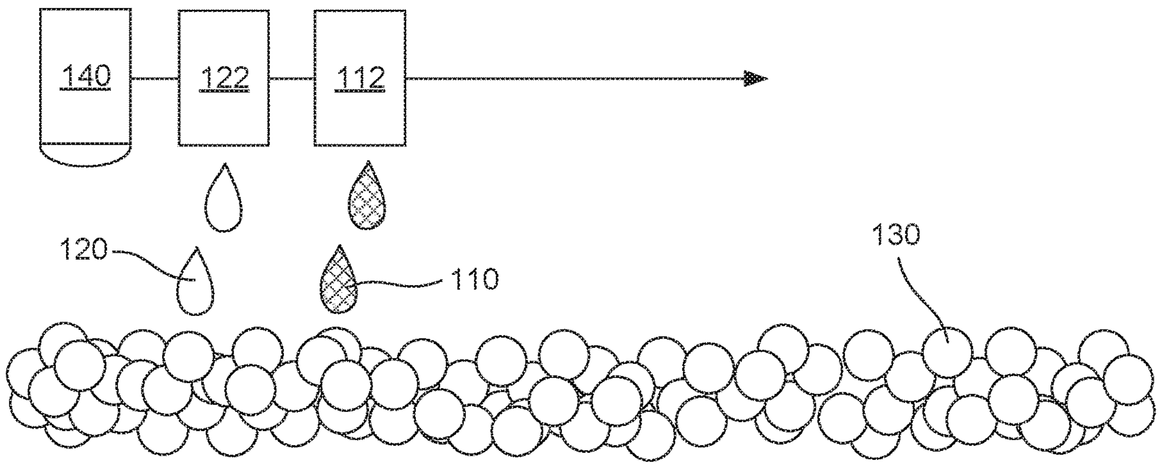
FIGS. 4A-4C are schematic diagrams illustrating an example method of making a three-dimensional printed object having anti-microbial properties in accordance with examples of the present disclosure.
Figure 4B:
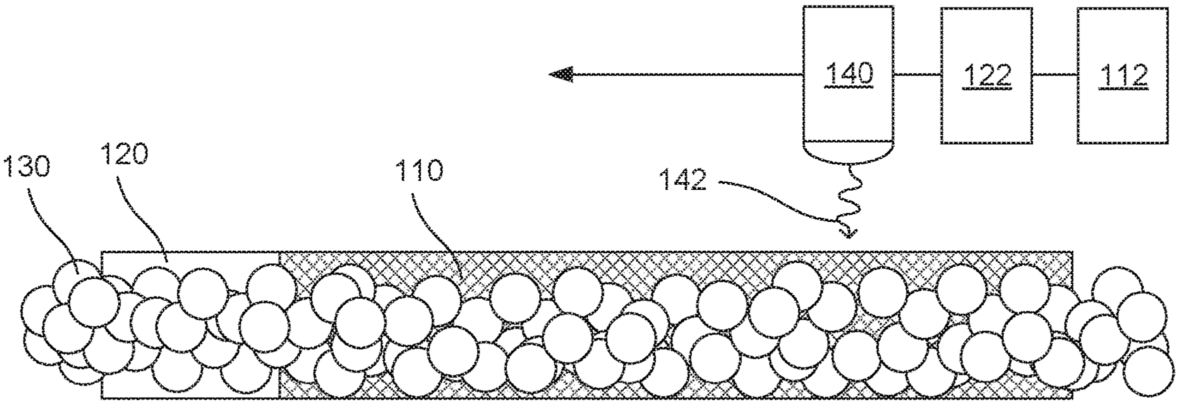
Figure 4C:
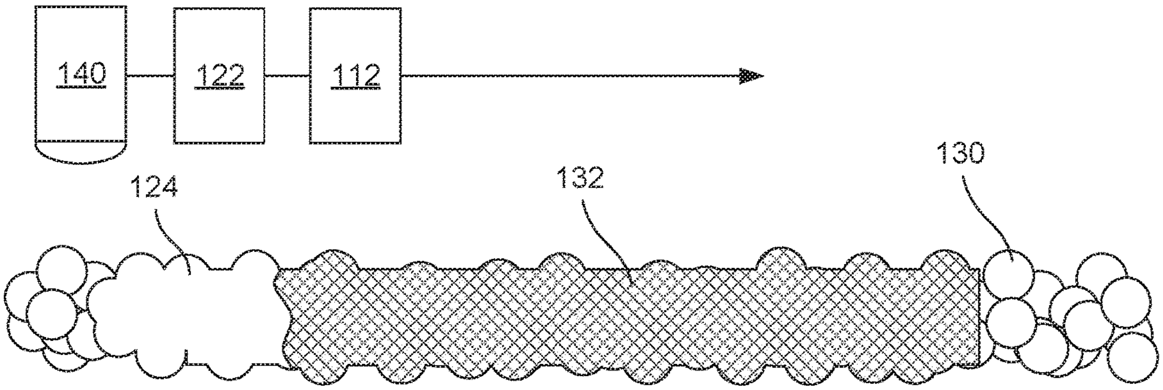

To further illustrate these various methods of making three-dimensional printed objects, FIGS. 4A-4C provide schematic illustrations of certain example methods. In FIG. 4A, a fusing agent 110 and a microbe-inhibiting agent 120 are jetted onto a layer of particulate build material 130. The fusing agent is jetted from a fusing agent ejector 112 and the microbe-inhibiting agent is jetted from a microbe-inhibiting agent ejector 122. These fluid ejectors can move across the layer of particulate build material to selectively jet fusing agent on areas that are to be fused. The microbe-inhibiting agent can be jetted on portions of the areas where the fusing agent is jetted. The microbe-inhibiting agent can include a metal-containing microbe-inhibiting material that will impart microbe-inhibiting properties to the build material. When the particulate build material is fused, the portions where the microbe-inhibiting agent was jetted can form areas having inhibited microbe growth on the final three-dimensional printed object. A radiation source 140 can also move across the layer of powder bed material. In some examples, the radiation source can move together with the fluid ejectors, such as in a printer carriage.

FIG. 4B shows the layer of particulate build material 130 after the fusing agent 110 has been jetted onto an area of the layer that is to be fused. Additionally, the microbe-inhibiting agent 120 has been jetted onto an area that will form an area having inhibited microbe growth in the final three-dimensional printed object. The area where the microbe-inhibiting agent is applied can be a portion of the area where the fusing agent is applied, so that both fusing agent and microbe-inhibiting agent are applied to this portion of the area. In this figure, the radiation source 140 is shown emitting radiation 142 toward the layer of polymer particles. The fusing agent can include a radiation absorber that can absorb this radiation and convert the radiation energy to heat.

FIG. 4C shows the layer of particulate build material 130 with a fused portion 132 where the fusing agent was jetted. This portion has reached a sufficient temperature to fuse the polymer particles together to form a solid polymer matrix. The area where the microbe-inhibiting agent was applied forms an area 124 having inhibited microbe growth. In this example, this area is located at the edge of the fused layer so that the microbe-inhibiting material will be at the surface of the three-dimensional printed object when the object is finished. The details shown in FIGS. 4A-4C are meant to supplement the method described in FIG. 3, and these details can be implemented to the extent consistent with the details of those methods, for example. Furthermore, the details shown in FIGS. 4A-4C can be considered in the context of the three-dimensional printing systems described hereinafter as well.

Although the example shown in FIGS. 4A-4C involves applying a fusing agent and a microbe-inhibiting agent to the particulate build material, in other examples the metal-containing microbe-inhibiting material can be included in the fusing agent instead of in a separate microbe-inhibiting agent. Therefore, in such examples, a three-dimensional printed object can be formed from the particulate build material and the fusing agent, without using any separate microbe-inhibiting agent. In certain examples, the metal-containing microbe-inhibiting material can act as a radiation absorber. Therefore, the metal-containing microbe-inhibiting material can be the radiation absorber that is included in the fusing agent. Alternatively, the fusing agent can include an additional radiation absorber other than the metal-containing microbe-inhibiting material.

In further examples, the methods of making three-dimensional printed objects can also include applying other fluid agents to the particulate build material. For example, a detailing agent can be applied to the particulate build material in some examples. The detailing agent can include a detailing compound, which is a compound that can reduce the temperature of powder bed material onto which the detailing agent is applied. In some examples, the detailing agent can be applied around edges of the area where the fusing agent is applied. This can prevent powder bed material around the edges from caking due to heat from the area where the fusing agent was applied. The detailing agent can also be applied in the same area where fusing was applied in order to control the temperature and prevent excessively high temperatures when the powder bed material is fused.

The fusing agent, microbe-inhibiting agent, and any other agents such as detailing agents can be jetted onto the powder bed using fluid jet print heads. The amount of the fusing agent used can be calibrated based the concentration of radiation absorber in the fusing agent, the level of fusing desired for the polymer particles, and other factors. In some examples, the amount of fusing agent printed can be sufficient to contact the radiation absorber with the entire layer of polymer powder. For example, if individual layers of polymer powder are 100 microns thick, then the fusing agent can penetrate 100 microns into the polymer powder. Thus the fusing agent can heat the polymer powder throughout the entire layer so that the layer can coalesce and bond to the layer below. After forming a solid layer, a new layer of loose powder can be formed, either by lowering the powder bed or by raising the height of a powder roller and rolling a new layer of powder.

In some examples, the entire powder bed can be preheated to a temperature below the melting or softening point of the polymer powder. In one example, the preheat temperature can be from about 10° C. to about 30° C. below the melting or softening point. In another example, the preheat temperature can be within 40° C. of the melting or softening point. Preheating can be accomplished with a lamp or lamps, an oven, a heated support bed, or other types of heaters. In some examples, the entire powder bed can be heated to a substantially uniform temperature.

The powder bed can be irradiated with a fusing lamp. Suitable fusing lamps for use in the methods described herein can include commercially available infrared lamps and halogen lamps. The fusing lamp can be a stationary lamp or a moving lamp. For example, the lamp can be mounted on a track to move horizontally across the powder bed. Such a fusing lamp can make multiple passes over the bed depending on the amount of exposure to coalesce printed layers. The fusing lamp can be configured to irradiate the entire powder bed with a substantially uniform amount of energy. This can selectively coalesce the printed portions with fusing agent leaving the unprinted portions of the polymer powder below the melting or softening point.

In one example, the fusing lamp can be matched with the radiation absorber in the fusing agent so that the fusing lamp emits wavelengths of light that match the peak absorption wavelengths of the radiation absorber. A radiation absorber with a narrow peak at a particular near-infrared wavelength can be used with a fusing lamp that emits a narrow range of wavelengths at approximately the peak wavelength of the radiation absorber. Similarly, a radiation absorber that absorbs a broad range of near-infrared wavelengths can be used with a fusing lamp that emits a broad range of wavelengths. Matching the radiation absorber and the fusing lamp in this way can increase the efficiency of coalescing the polymer particles with the fusing agent printed thereon, while the unprinted polymer particles do not absorb as much light and remain at a lower temperature.

Depending on the amount of radiation absorber present in the polymer powder, the absorbance of the radiation absorber, the preheat temperature, and the melting or softening point of the polymer, an appropriate amount of irradiation can be supplied from the fusing lamp. In some examples, the fusing lamp can irradiate individual layers from about 0.5 to about 10 seconds per pass.

The amount of the metal-containing microbe-inhibiting material that is applied to the particulate build material can be sufficient to provide inhibited microbe growth on the final three-dimensional printed object. In examples where the metal-containing microbe-inhibiting material is included in the fusing agent, the amount of fusing agent applied can be selected so that the fusing agent allows the particulate build material to heat up and become fused together, while also imparting microbe-inhibiting properties to the three-dimensional printed object. In other examples, when a separate microbe-inhibiting agent is used, then the amount of the microbe-inhibiting agent applied to the particulate build material can be sufficient to impart the microbe-inhibiting properties. The concentration of the metal-containing microbe-inhibiting material in these fluid agents can also be adjusted to control the amount of the metal-containing microbe-inhibiting material that is applied to the particulate build material.

As used herein, "inhibited microbe growth" can refer to any reduction in the growth rate of microbes compared to a three-dimensional printed object that does not include the metal-containing microbe-inhibiting material. In various examples, a three-dimensional printed object formed using the methods described herein can include an area having inhibited microbe growth. This can be an area of the surface of the three-dimensional printed object where the growth rate of microbes is slowed, or growth of microbes is prevented, or microbes are actively killed by the metal-containing microbe-inhibiting material in the three-dimensional printed object.

In various examples, the amount of metal-containing microbe-inhibiting material in the three-dimensional printed object can be expressed as a volume percent (vol %). This value can be calculated as the volume of the metal-containing microbe-inhibiting material out of the combined volume of the metal-containing microbe-inhibiting material and the particulate build material in the area where the metal-containing microbe-inhibiting material is applied. If the metal-containing microbe-inhibiting material is applied throughout the entire volume of the three-dimensional printed object, then the volume percent can be with respect to the total volume of the entire three-dimensional printed object. However, if the metal-containing microbe-inhibiting material is applied to a smaller portion of the three-dimensional printed object, then the volume percent can be with respect to the geometric volume of the portion where the metal-containing microbe-inhibiting material is present. For example, if the metal-containing microbe-inhibiting material is present in a 1-mm-thick layer on one surface of the three-dimensional printed object, then the volume percent is with respect to the geometric volume of the 1-mm-thick layer of the surface where the metal-containing microbe-inhibiting material is present. In some examples, the amount of metal-containing microbe-inhibiting material can be from about 0.01 vol % to about 9 vol %, or from about 0.01 vol % to about 4 vol %, or from about 0.01 vol % to about 2 vol %, or from about 0.1 vol % to about 2.5 vol %, or from about 0.2 vol % to about 2.5 vol %, or from about 0.01 vol % to about 0.3 vol %.

In some examples, the metal-containing microbe-inhibiting material can be an electrically conductive material. For example, metal particles can have significant electrical conductivity. However, in certain examples, the amount of the metal-containing microbe-inhibiting material applied to the particulate build material can be less than an amount that would make the three-dimensional printed object electrically conductive. In certain examples, the amount of metal-containing microbe-inhibiting material can be such that the three-dimensional printed object (if free from additional materials that would add to the electrical conductivity) has a conductivity less than about $10^{-3}$ S/m, or less than about $10^{-4}$ S/m, or less than about $10^{-5}$ S/m at room temperature.

In some examples, a three-dimensional printed object can be formed with an area having inhibited microbe growth on a surface of the object. In one example, the entire surface of the object can have inhibited microbe growth. In another example, a portion of the surface of the object can have inhibited microbe growth, and the remainder of the surface can be devoid of the metal-containing microbe-inhibiting material. Multiple areas on the surface of the object can also be made to have inhibited microbe growth. The methods described herein can be used to selectively form the areas of inhibited microbe growth in specific locations where it is desired to reduce microbe growth. For example, a three-dimensional printed prosthetic device can have a particular portion of the surface where microbe growth tends to occur. The metal-containing microbe-inhibiting material can be applied to this particular portion to inhibit microbe growth in this area. Other applications in which microbe-inhibiting surfaces can be useful include biological assays, medical devices, high touch surfaces, tool handles and grips, portions of objects exposed to high humidity that encourages microbe growth, and others.

In certain examples, the metal-containing microbe-inhibiting material can be distributed throughout the entire thickness of a three-dimensional printed object. However, in other examples, the metal-containing microbe-inhibiting material can be located in a thinner layer or shell at the surface of the three-dimensional printed object. The metal-containing microbe-inhibiting material can be present in the fused polymer of the object at the surface and down to a depth that is sufficient to maintain the microbe-inhibiting properties after any wear and tear that is expected for the object. In some examples, the layer having the metal-containing microbe-inhibiting material can extend from the surface of the object to a depth of about 0.05 mm to about 5 mm, or to a depth of about 0.1 mm to about 1 mm.

The three-dimensional printing process can be very versatile and can allow for the metal-containing microbe-inhibiting material to be located in any portion of the three-dimensional printed object. In certain examples, microbe-inhibiting areas can be formed at portions of the surface of the object that would be difficult or impossible to coat with an anti-microbial coating through a masking process or other selective coating process. In some examples, the area having inhibited microbe growth can be located on a concave surface or surface that is obstructed by other portions of the object, and which would be difficult to coat with an anti-microbial coating. In further examples, the area having inhibited microbe growth can be located on an interior surface that may not be directly visible from the outside of the three-dimensional printed object. For example, a three-dimensional printed microfluidic device can include internal channels or cavities that can have surfaces with microbe-inhibiting properties. The metal-containing microbe-inhibiting material can easily be applied to the particulate build material that forms these surfaces during the three-dimensional printing process.

In further examples, the metal-containing microbe-inhibiting material can be embedded deeper within a solid portion of the three-dimensional printed object. The object can be designed such that this deeper location will be exposed through a post-processing operation after three-dimensional printing, such as drilling, cutting, sanding, and so on. For example, a three-dimensional object can be designed to have a hole drilled through a solid portion of the object after the object has been printed. If microbe-inhibiting properties are desired at the surface of the drilled hole, then the metal-containing microbe-inhibiting material can be embedded in the solid portion of the object so that this part of the object will have microbe-inhibiting properties when exposed by the drilling.

As mentioned above, the three-dimensional printed object can be formed by applying the fusing agent and microbe-inhibiting agent, if used, to layers of a powder bed of particulate build material according to a three-dimensional object model. Three-dimensional object models can in some examples be created using computer aided design (CAD) software. Three-dimensional object models can be stored in any suitable file format. In some examples, a three-dimensional printed object as described herein can be based on a single three-dimensional object model. The three-dimensional object model can define the three-dimensional shape of the object. In certain examples, the three-dimensional object model can also include a model of portions of the object where metal-containing microbe-inhibiting material is to be applied. In further examples, the three-dimensional object model may include both the three-dimensional shape of the object and also the three-dimensional shape of the portions of the powder bed where detailing agent is to be applied. In other examples, the object can be defined by a first three-dimensional object model and the area where the detailing agent is to be applied can be defined by a second three-dimensional object model. In still further examples, the areas where detailing agent is applied can be determined procedurally. Other information may also be included in the three-dimensional object model, such as structures to be formed of additional different materials or color data for printing the object with various colors at different locations on the object. The three-dimensional object model may also include features or materials specifically related to applying fluids, such as by jetting, on layers of powder bed material, such as the desired amount of fluid to be applied to a given area. This information may be in the form of a droplet saturation, for example, which can instruct a three-dimensional printing system to jet a certain number of droplets of fluid into a specific area. This can allow the three-dimensional printing system to finely control radiation absorption, microbe-inhibiting properties, cooling, color saturation, and so on. All this information can be contained in a single three-dimensional object file or a combination of multiple files. The three-dimensional printed object can be made based on the three-dimensional object model. As used herein, "based on the three-dimensional object model" can refer to printing using a single three-dimensional object model file or a combination of multiple three-dimensional object models that together define the object. In certain examples, software can be used to convert a three-dimensional object model to instructions for a three-dimensional printer to form the object by building up individual layers of build material.

In an example of the three-dimensional printing process, a thin layer of polymer powder can be spread on a bed to form a powder bed. At the beginning of the process, the powder bed can be empty because no polymer particles have been spread at that point. For the first layer, the polymer particles can be spread onto an empty build platform. The build platform can be a flat surface made of a material sufficient to withstand the heating conditions of the three-dimensional printing process, such as a metal. Thus, "applying" individual particulate build material layers to a powder bed includes spreading particulate build material onto the empty build platform for the first layer. In other examples, a number of initial layers of particulate build material can be spread before the printing begins. These "blank" layers of build material can in some examples number from about 10 to about 500, from about 10 to about 200, or from about 10 to about 100. In some cases, spreading multiple layers of powder before beginning the print can increase temperature uniformity of the three-dimensional printed object. A fluid jet printing head, such as an inkjet print head, can then be used to print a fusing agent including a radiation absorber over portions of the powder bed corresponding to a thin layer of the three-dimensional object to be formed. Then the bed can be exposed to electromagnetic energy, e.g., typically the entire bed. The electromagnetic energy can include light, infrared radiation, and so on. The radiation absorber can absorb more energy from the electromagnetic energy than the unprinted powder. The absorbed light energy can be converted to thermal energy, causing the printed portions of the powder to soften and fuse together into a formed layer. After the first layer is formed, a new thin layer of polymer powder can be spread over the powder bed and the process can be repeated to form additional layers until a complete three-dimensional object is printed. Thus, "applying" individual particulate build material layers to a powder bed also includes spreading layers of particulate build material over the loose particles and fused layers beneath the new layer of particulate build material.

Three-Dimensional Printing Systems

The present disclosure also describes three-dimensional printing systems that can be used to perform the methods described herein. In a particular example, a three-dimensional printing system can include a particulate build material, a fusing agent applicator, and a microbe-inhibiting agent applicator. The particulate build material can include polymer particles. The fusing agent applicator can be fluidly coupled or coupleable to a fusing agent, and the fusing agent applicator can be directable to iteratively apply the fusing agent to layers of the particulate build material. The fusing agent can include water and an electromagnetic radiation absorber. The electromagnetic radiation absorber can absorb radiation and convert the radiation energy to heat. The microbe-inhibiting agent applicator can be fluidly coupled or coupleable to a microbe-inhibiting agent, and the microbe-inhibiting agent applicator can be directable to iteratively apply the microbe-inhibiting agent to layers of the particulate build material. The microbe-inhibiting agent can include a metal-containing microbe-inhibiting material.

As used herein, "fluidly coupled" and "coupleable" can refer to the capability of the fluid agent applicators to access the fluid agents (i.e., fusing agent and microbe-inhibiting agent) and apply the fluid agents onto the particulate build material. In some examples, the printing system can include a fusing agent reservoir that is fluidly coupled to the fusing agent applicator, meaning that the fusing agent can flow from the reservoir to the fusing agent applicator and the fusing agent applicator can apply the fusing agent to the particulate build material. In other examples, the fusing agent applicator can be coupleable to an external reservoir of fusing agent, meaning that the fusing agent applicator can be configured to connect to the fusing agent reservoir, but the fusing agent reservoir may not be present in the printing system per se.

In further examples, the system can further include a radiant energy source positioned to expose the layers of particulate build material to radiation energy to selectively fuse the particulate build material in contact with the electromagnetic radiation absorber and thereby form a three-dimensional printed object. In another example, the system can include a hardware controller in communication with the microbe-inhibiting agent applicator. The hardware controller can be programmed to direct the microbe-inhibiting agent applicator to apply the microbe-inhibiting agent onto the particulate build material in a sufficient amount to form an area having inhibited microbe growth. In still further examples, the hardware controller can also be programmed to generate a command to direct a build material applicator of the three-dimensional printing system to apply particulate build material layers to a powder bed of the three-dimensional printing system, direct the fusing agent applicator to iteratively and selectively apply the fusing agent to build material layers based on a three-dimensional object model, direct a radiant energy source of the three-dimensional printing system to expose the layer of powder bed material to radiation energy to selectively fuse the particulate build material in contact with the electromagnetic radiation absorber and thereby form a three-dimensional printed object, or a combination thereof.

Figure 5:
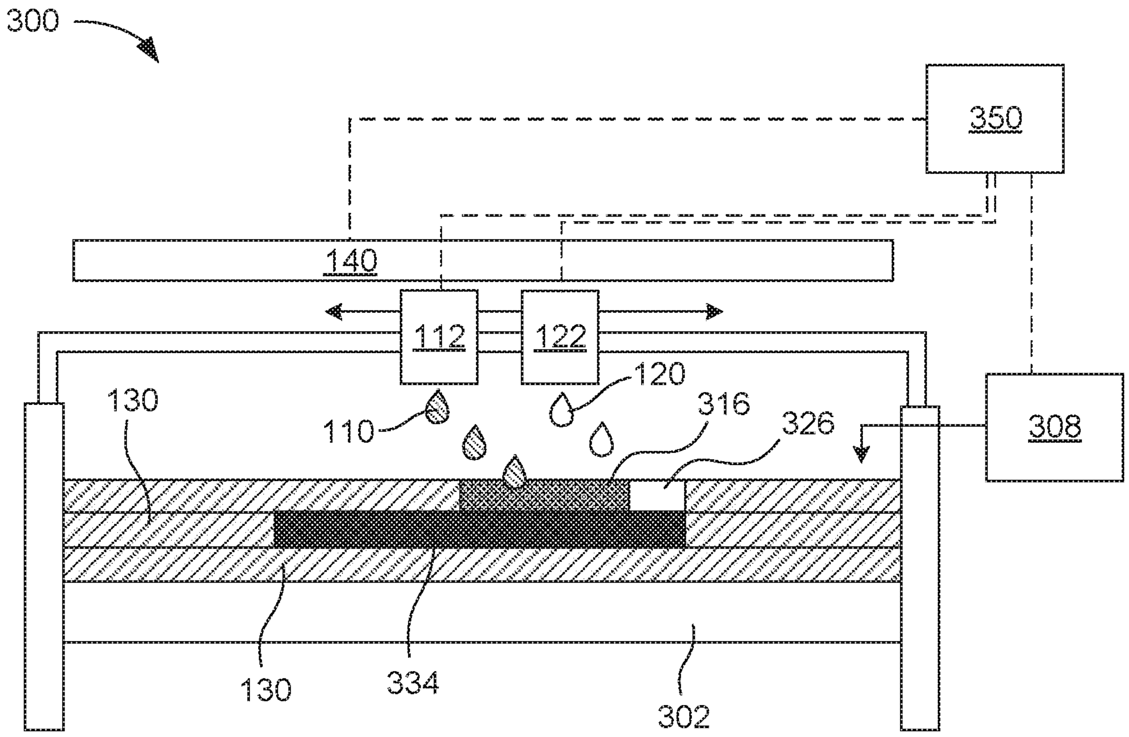
FIG. 5 is a schematic diagram of an example three-dimensional printing system in accordance with examples of the present disclosure.

FIG. 5 shows an example three-dimensional printing system 300 in accordance with the present disclosure. The system includes a build platform 302. Particulate build material 130 can be deposited onto the build platform by a build material applicator 308 where the particulate build material can be flattened or smoothed, such as by a mechanical roller or other flattening technique. This can form a flat layer of particulate build material. The fusing agent 110 can then be applied to the layer by a fusing agent applicator 112. A microbe-inhibiting agent 120 can also be applied by a microbe-inhibiting agent applicator 122. A first area 316 where the fusing agent is applied can correspond to a layer or slice of a three-dimensional object model. The microbe-inhibiting agent can be applied to a second area 326, which can be a portion of the area where the fusing agent is applied. In other examples, the microbe-inhibiting agent can have its own radiation absorbing properties and can act as a fusing agent on its own, and therefore may be applied to an area where the fusing agent was not applied. The system also includes a radiant energy source 140 that can expose the powder bed to radiant energy to fuse the particulate build material where the fusing agent was applied. FIG. 5 shows a first layer of fused polymer 334 that has already formed, with an additional layer of particulate build material spread over the top, and the system is in the process of applying the fusing agent and microbe-inhibiting agent to the additional layer to form another layer of the three-dimensional printed object. In further detail, there can be a hardware controller 350 connected to the microbe-inhibiting agent applicator. The hardware controller can be programmed to direct the microbe-inhibiting agent applicator to apply the microbe-inhibiting agent in a sufficient amount to form an area having inhibited microbe growth. The hardware controller can also be connected to various other components of the system to generate commands to direct those components to perform their functions. For example, the hardware controller can generate a command to direct a build material applicator of the three-dimensional printing system to apply particulate build material layers to a powder bed of the three-dimensional printing system, direct the fusing agent applicator to iteratively and selectively apply the fusing agent to build material layers based on a three-dimensional object model, direct a radiant energy source of the three-dimensional printing system to expose the layer of powder bed material to radiation energy to selectively fuse the particulate build material in contact with the electromagnetic radiation absorber and thereby form a three-dimensional printed object, or a combination thereof.

In some examples, the hardware controller can include a module or modules for performing the operations described above. For example, the hardware controller can include a module for directing the microbe-inhibiting agent applicator to apply the microbe-inhibiting agent onto the particulate build material in a sufficient amount to form an area having inhibited microbe growth. Other modules can include modules for directing the fusing agent applicator, radiant energy source, build platform, build material applicator, heaters, and so on. These functional units of the three-dimensional printing system are described as modules in order to emphasize their implementation independence. For example, a module can be implemented as a hardware circuit including custom very-large-scale integration (VLSI) circuits or gate arrays, off-the-shelf semiconductors such as logic chips, transistors, or other discrete components. A module can also be implemented in programmable hardware devices such as field programmable gate arrays, programmable array logic, programmable logic devices or the like.

Modules can also be implemented in machine-readable software for execution by various types of processors. An identified module of executable code can, for instance, include block(s) of computer instructions, which can be organized as an object, procedure, or function. Nevertheless, the executables of an identified module need not be physically located together, but can include disparate instructions stored in different locations which include the module and achieve the stated purpose for the module when joined logically together.

Indeed, a module of executable code can be a single instruction, or many instructions, and can even be distributed over several different code segments, among different programs, and across several memory devices. Similarly, operational data can be identified and illustrated herein within modules, and can be in a suitable form and organized within a suitable type of data structure. The operational data can be collected as a single data set, or can be distributed over different locations including over different storage devices. The modules can be passive or active, including agents operable to perform desired functions.

The modules described herein can also be stored on a computer readable storage medium that includes volatile and non-volatile, removable and non-removable media implemented with a disclosure for the storage of information such as computer readable instructions, data structures, program modules, or other data. Computer readable storage media can include, but are not limited to, RAM, ROM, electrically erasable programmable read-only memory (EEPROM), flash memory or other memory disclosure, compact disc read-only memory (CD-ROM), digital versatile disks (DVD) or other optical storage, magnetic cassettes, magnetic tapes, magnetic disk storage or other magnetic storage devices, or other computer storage medium which can be used to store the desired information.

In some examples the hardware controller can include some or all of the modules described above as hardware components. In other examples, the hardware controller can be capable of executing the modules described above as software modules. In some examples, a combination of hardware and software modules can be used Powder Bed Material In certain examples, the powder bed material can include polymer particles having a variety of shapes, such as substantially spherical particles or irregularly-shaped particles. In some examples, the polymer powder can be capable of being formed into three-dimensional printed objects with a resolution of about 20 μm to about 100 μm, about 30 μm to about 90 μm, or about 40 μm to about 80 μm. As used herein, "resolution" refers to the size of the smallest feature that can be formed on a three-dimensional printed object. The polymer powder can form layers from about 20 μm to about 100 μm thick, allowing the fused layers of the printed part to have roughly the same thickness. This can provide a resolution in the z-axis (i.e., depth) direction of about 20 μm to about 100 μm. The polymer powder can also have a sufficiently small particle size and sufficiently regular particle shape to provide about 20 μm to about 100 μm resolution along the x-axis and y-axis (i.e., the axes parallel to the top surface of the powder bed). For example, the polymer powder can have an average particle size from about 20 μm to about 100 μm. In other examples, the average particle size can be from about 20 μm to about 50 μm. Other resolutions along these axes can be from about 30 μm to about 90 μm or from 40 μm to about 80 μm.

The polymer powder can have a melting or softening point from about 70° C. to about 350° C. In further examples, the polymer can have a melting or softening point from about 150° C. to about 200° C. A variety of thermoplastic polymers with melting points or softening points in these ranges can be used. For example, the polymer powder can be polyamide 6 powder, polyamide 9 powder, polyamide 11 powder, polyamide 12 powder, polyamide 6/6 powder, polyamide 6/12 powder, thermoplastic polyamide powder, polyamide copolymer powder, polyethylene powder, wax, thermoplastic polyurethane powder, acrylonitrile butadiene styrene powder, amorphous polyamide powder, polymethylmethacrylate powder, ethylene-vinyl acetate powder, polyarylate powder, silicone rubber, polypropylene powder, polyester powder, polycarbonate powder, copolymers of polycarbonate with acrylonitrile butadiene styrene, copolymers of polycarbonate with polyethylene terephthalate, polyether ketone powder, polyacrylate powder, polystyrene powder, polyvinylidene fluoride powder, polyvinylidene fluoride copolymer powder, poly(vinylidene fluoride-trifluoroethylene) powder, poly(vinylidene fluoride-trifluoroethylene-chlorotrifluoroethylene) powder, or mixtures thereof. In a specific example, the polymer powder can be polyamide 12, which can have a melting point from about 175° C. to about 200° C. In another specific example, the polymer powder can be thermoplastic polyurethane.

The polymer particles can also in some cases be blended with a filler. The filler can include inorganic particles such as alumina, silica, fibers, carbon nanotubes, or combinations thereof. When the thermoplastic polymer particles fuse together, the filler particles can become embedded in the polymer, forming a composite material. In some examples, the filler can include a free-flow agent, anti-caking agent, or the like. Such agents can prevent packing of the powder particles, coat the powder particles and smooth edges to reduce inter-particle friction, and/or absorb moisture. In some examples, a weight ratio of thermoplastic polymer particles to filler particles can be from about 100:1 to about 1:2 or from about 5:1 to about 1:1.

Fusing Agents

The three-dimensional printing kits described herein can include a fusing agent to be applied to the polymer build material. The fusing agent can include a radiation absorber that can absorb radiant energy and convert the energy to heat. In certain examples, the fusing agent can be used with a powder bed material in a particular three-dimensional printing process. A thin layer of powder bed material can be formed, and then the fusing agent can be selectively applied to areas of the powder bed material that are desired to be consolidated to become part of the solid three-dimensional printed object. The fusing agent can be applied, for example, by printing such as with a fluid ejector or fluid jet print head. Fluid jet print heads can jet the fusing agent in a similar way as an inkjet print head jetting ink. Accordingly, the fusing agent can be applied with great precision to certain areas of the powder bed material that are desired to form a layer of the final three-dimensional printed object. After applying the fusing agent, the powder bed material can be irradiated with radiant energy. The radiation absorber from the fusing agent can absorb this energy and convert it to heat, thereby heating any polymer particles in contact with the radiation absorber. An appropriate amount of radiant energy can be applied so that the area of the powder bed material that was printed with the fusing agent heats up enough to melt the polymer particles to consolidate the particles into a solid layer, while the powder bed material that was not printed with the fusing agent remains as a loose powder with separate particles.

In some examples, the amount of radiant energy applied, the amount of fusing agent applied to the powder bed, the concentration of radiation absorber in the fusing agent, and the preheating temperature of the powder bed (i.e., the temperature of the powder bed material prior to printing the fusing agent and irradiating) can be tuned to ensure that the portions of the powder bed printed with the fusing agent will be fused to form a solid layer and the unprinted portions of the powder bed will remain a loose powder. These variables can be referred to as parts of the "print mode" of the three-dimensional printing system. The print mode can include any variables or parameters that can be controlled during three-dimensional printing to affect the outcome of the three-dimensional printing process.

The process of forming a single layer by applying fusing agent and irradiating the powder bed can be repeated with additional layers of fresh powder bed material to form additional layers of the three-dimensional printed object, thereby building up the final object one layer at a time. In this process, the powder bed material surrounding the three-dimensional printed object can act as a support material for the object. When the three-dimensional printing is complete, the object can be removed from the powder bed and any loose powder on the object can be removed.

Accordingly, in some examples, the fusing agent can include a radiation absorber that is capable of absorbing electromagnetic radiation to produce heat. The radiation absorber can be colored or colorless. In various examples, the radiation absorber can be a pigment such as carbon black pigment, glass fiber, titanium dioxide, clay, mica, talc, barium sulfate, calcium carbonate, a near-infrared absorbing dye, a near-infrared absorbing pigment, a conjugated polymer, a dispersant, or combinations thereof. Examples of near-infrared absorbing dyes include aminium dyes, tetraaryldiamine dyes, cyanine dyes, pthalocyanine dyes, and others. In further examples, the radiation absorber can be a near-infrared absorbing conjugated polymer such as poly(3,4-ethylenedioxythiophene)-poly(styrenesulfonate) (PEDOT:PSS), a polythiophene, poly(p-phenylene sulfide), a polyaniline, a poly(pyrrole), a poly(acetylene), poly(p-phenylene vinylene), polyparaphenylene, or combinations thereof. As used herein, "conjugated" refers to alternating double and single bonds between atoms in a molecule. Thus, "conjugated polymer" refers to a polymer that has a backbone with alternating double and single bonds. In many cases, the radiation absorber can have a peak absorption wavelength in the range of about 800 nm to about 1400 nm.

A variety of near-infrared pigments can also be used. Non-limiting examples can include phosphates having a variety of counterions such as copper, zinc, iron, magnesium, calcium, strontium, the like, and combinations thereof. Non-limiting specific examples of phosphates can include $M_2P_2O_7$, $M_4P_2O_9$, $M_5P_2O_{10}$, $M_3(PO_4)_2$, $M(PO_3)_2$, $M_2P_4O_{12}$, and combinations thereof, where M represents a counterion having an oxidation state of +2, such as those listed above or a combination thereof. For example, $M_2P_2O$ can include compounds such as $Cu_2P_2O_7$, $Cu/MgP_2O_7$, $Cu/ZnP_2O_7$, or any other suitable combination of counterions. It is noted that the phosphates described herein are not limited to counterions having a +2 oxidation state. Other phosphate counterions can also be used to prepare other suitable near-infrared pigments.

Additional near-infrared pigments can include silicates. Silicates can have the same or similar counterions as phosphates. One non-limiting example can include $M_2SiO_4$, $M_2Si_2O_6$, and other silicates where M is a counterion having an oxidation state of +2. For example, the silicate $M_2Si_2O_6$ can include $Mg_2Si_2O_6$, $Mg/CaSi_2O_6$, $MgCuSi_2O_6$, $Cu_2Si_2O_6$, $Cu/ZnSi_2O_8$, or other suitable combination of counterions. It is noted that the silicates described herein are not limited to counterions having a +2 oxidation state. Other silicate counterions can also be used to prepare other suitable near-infrared pigments.

In further examples, the radiation absorber can include a tungsten bronze or a molybdenum bronze. In certain examples, tungsten bronzes can include compounds having the formula $M_xWO_3$, where M is a metal other than tungsten and x is equal to or less than 1. Similarly, in some examples, molybdenum bronzes can include compounds having the formula $M_xMoO_3$, where M is a metal other than molybdenum and x is equal to or less than 1.

In still other examples, the radiation absorber can be selected to provide that the fusing agent is a "low tint fusing agent" that may be transparent, pale in color, or white. For example, the electromagnetic radiation absorber may be transparent or white at wavelengths ranging from about 400 nm to about 780 nm. In some examples, the term "transparent" as used herein, indicates that about 20% or less of the radiation having wavelengths from about 400 nm to about 780 nm is absorbed. Thus, in examples herein, the low tint fusing agent can be white, colorless, or pale in coloration so that coloring agent can be effective in coloring the polymeric powder bed material without much, if any, interference in coloration from the radiation absorber. At the same time, the low tint fusing agent can generate heat when exposed to electromagnetic energy wavelengths from 800 nm to 4,000 nm sufficient to partially or fully melt or coalesce the polymeric powder bed material that is in contact with the low tint fusing agent.

In alternative examples, the radiation absorber can preferentially absorb ultraviolet radiation. In some examples, the radiation absorber can absorb radiation in a wavelength range from about 300 nm to about 400 nm. In certain examples, the amount of electromagnetic energy absorbed by the fusing agent can be quantified as follows: a layer of the fusing agent having a thickness of 0.5 μm after liquid components have been removed can absorb from 90% to 100% of radiant electromagnetic energy having a wavelength within a wavelength range from about 300 nm to about 400 nm. The radiation absorber may also absorb little or no visible light, thus making the radiation absorber transparent to visible light. In certain examples, the 0.5 μm layer of the fusing agent can absorb from 0% to 20% of radiant electromagnetic energy in a wavelength range from above about 400 nm to about 700 nm. Non-limiting examples of ultraviolet absorbing radiation absorbers can include nanoparticles of titanium dioxide, zinc oxide, cerium oxide, indium tin oxide, or a combination thereof. In some examples, the nanoparticles can have an average particle size from about 2 nm to about 300 nm, from about 10 nm to about 100 nm, or from about 10 nm to about 60 nm.

A dispersant can be included in the fusing agent in some examples. Dispersants can help disperse the radiation absorbing pigments described above. In some examples, the dispersant itself can also absorb radiation. Non-limiting examples of dispersants that can be included as a radiation absorber, either alone or together with a pigment, can include polyoxyethylene glycol octylphenol ethers, ethoxylated aliphatic alcohols, carboxylic esters, polyethylene glycol ester, anhydrosorbitol ester, carboxylic amide, polyoxyethylene fatty acid amide, poly (ethylene glycol) p-isooctylphenyl ether, sodium polyacrylate, and combinations thereof.

The amount of radiation absorber in the fusing agent can vary depending on the type of radiation absorber. In some examples, the concentration of radiation absorber in the fusing agent can be from about 0.1 wt % to about 20 wt %. In one example, the concentration of radiation absorber in the fusing agent can be from about 0.1 wt % to about 15 wt %. In another example, the concentration can be from about 0.1 wt % to about 8 wt %. In yet another example, the concentration can be from about 0.5 wt % to about 2 wt %. In a particular example, the concentration can be from about 0.5 wt % to about 1.2 wt %. In one example, the radiation absorber can have a concentration in the fusing agent such that after the fusing agent is jetted onto the polymer powder, the amount of radiation absorber in the polymer powder can be from about 0.0003 wt % to about 10 wt %, or from about 0.005 wt % to about 5 wt %, with respect to the weight of the polymer powder.

In some examples, the fusing agent can be jetted onto the polymer powder build material using a fluid jetting device, such as inkjet printing architecture. Accordingly, in some examples, the fusing agent can be formulated to give the fusing agent good jetting performance. Ingredients that can be included in the fusing agent to provide good jetting performance can include a liquid vehicle. Thermal jetting can function by heating the fusing agent to form a vapor bubble that displaces fluid around the bubble, and thereby forces a droplet of fluid out of a jet nozzle. Thus, in some examples the liquid vehicle can include a sufficient amount of an evaporating liquid that can form vapor bubbles when heated. The evaporating liquid can be a solvent such as water, an alcohol, an ether, or a combination thereof.

In some examples, the liquid vehicle formulation can include a co-solvent or co-solvents present in total at from about 1 wt % to about 50 wt %, depending on the jetting architecture. Further, a non-ionic, cationic, and/or anionic surfactant can be present, ranging from about 0.01 wt % to about 5 wt %. In one example, the surfactant can be present in an amount from about 1 wt % to about 5 wt %. The liquid vehicle can include dispersants in an amount from about 0.5 wt % to about 3 wt %. The balance of the formulation can be purified water, and/or other vehicle components such as biocides, viscosity modifiers, materials for pH adjustment, sequestering agents, preservatives, and the like. In one example, the liquid vehicle can be predominantly water.

In some examples, a water-dispersible or water-soluble radiation absorber can be used with an aqueous vehicle. Because the radiation absorber is dispersible or soluble in water, an organic co-solvent may not be present, as it may not be included to solubilize the radiation absorber. Therefore, in some examples the fluids can be substantially free of organic solvent, e.g., predominantly water. However, in other examples a co-solvent can be used to help disperse other dyes or pigments, or enhance the jetting properties of the respective fluids. In still further examples, a non-aqueous vehicle can be used with an organic-soluble or organic-dispersible fusing agent.

Classes of co-solvents that can be used can include organic co-solvents including aliphatic alcohols, aromatic alcohols, diols, glycol ethers, polyglycol ethers, caprolactams, formamides, acetamides, and long chain alcohols. Examples of such compounds include 1-aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like. Specific examples of solvents that can be used include, but are not limited to, 2-pyrrolidinone, N-methylpyrrolidone, 2-hydroxyethyl-2-pyrrolidone, 2-methyl-1,3-propanediol, tetraethylene glycol, 1,6-hexanediol, 1,5-hexanediol and 1,5-pentanediol.

Regarding the surfactant that may be present, a surfactant or surfactants can be used, such as alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and the like. The amount of surfactant added to the fusing agent may range from about 0.01 wt % to about 20 wt %. Suitable surfactants can include, but are not limited to, liponic esters such as TERGITOL™ 15-S-12, TERGITOL™ 15-S-7 available from Dow Chemical Company (Michigan), LEG-1 and LEG-7; TRITON™ X-100; TRITON™ X-405 available from Dow Chemical Company (Michigan); and sodium dodecylsulfate.

Various other additives can be employed to enhance certain properties of the fusing agent for specific applications. Examples of these additives are those added to inhibit the growth of harmful microorganisms in the fusing agent before the fusing agent is applied. These additives may be biocides, fungicides, and other microbial agents, which can be used in various formulations. Examples of suitable microbial agents include, but are not limited to, NUOSEPT® (Nudex, Inc., New Jersey), UCARCIDE™ (Union carbide Corp., Texas), VANCIDE® (R.T. Vanderbilt Co., Connecticut), PROXEL® (ICI Americas, New Jersey), and combinations thereof.

Sequestering agents, such as EDTA (ethylene diamine tetra acetic acid), may be included to eliminate the deleterious effects of heavy metal impurities, and buffer solutions may be used to control the pH of the fluid. From about 0.01 wt % to about 2 wt %, for example, can be used. Viscosity modifiers and buffers may also be present, as well as other additives to modify properties of the fluid as desired. Such additives can be present at from about 0.01 wt % to about 20 wt %.

In certain further examples, the fusing agent can include from about 5 wt % to about 40 wt % organic co-solvent, from about 0 wt % to about 20 wt % high boiling point solvent, from about 0.1 wt % to about 1 wt % surfactant, from about 0.1 wt % to about 1 wt % anti-kogation agent, from about 0.01 wt % to about 1 wt % chelating agent, from about 0.01 wt % to about 1 wt % biocide, and from about 1 wt % to about 10 wt % carbon black pigment. The balance can be deionized water.

Microbe-Inhibiting Agents

The microbe-inhibiting agents described herein can include a metal-containing microbe-inhibiting material. As explained above, in some cases the metal-containing microbe-inhibiting material can be an ingredient in the fusing agent. However, in other examples, the metal-containing microbe-inhibiting material can be in a separate microbe-inhibiting agent. The concentration of the metal-containing microbe-inhibiting material in the microbe-inhibiting agent (or fusing agent) can vary depending on the amount of the agent that will be applied to the particulate build material and the desired amount of metal-containing microbe-inhibiting material to be present in the final three-dimensional printed object. In some examples, the concentration of the metal-containing microbe-inhibiting material in the microbe-inhibiting agent (or the fusing agent) can be from about 1 wt % to about 30 wt %, or from about 1 wt % to about 10 wt %, or from about 1 wt % to about 3 wt %, or from about 3 wt % to about 10 wt %, or from about 5 wt % to about 10 wt %, or from about 5 wt % to about 20 wt %, or from about 5 wt % to about 30 wt %, or from about 10 wt % to about 30 wt %.

A variety of metal-containing microbe-inhibiting materials can be used. In some examples, the metal in the metal-containing microbe-inhibiting material can be in a metallic form or in the form of a compound that includes a metal atom. In certain examples, the metal can be a transition metal.

In some examples, the metal-containing microbe-inhibiting material can be a metal bis(dithiolene) complex. In certain examples, the metal of the metal bis(dithiolene) complex can be nickel, zinc, platinum, palladium, or molybdenum. In some examples, the metal bis(dithiolene) complex can have the following structure:

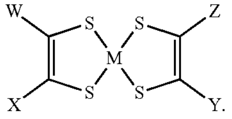

In this structure, M can be nickel, zinc, platinum, palladium, or molybdenum. W, X, Y, and Z can independently be hydrogen, a phenyl group, a phenyl group bonded to an R group, or a sulfur bonded to an R group. The R group can be $C_nH_{2n+1}$, or $OC_nH_{2n+1}$, or $N(CH_3)_2$. The integer n can be from 2 to 12, in some examples.

In further examples, the metal-containing microbe-inhibiting material can be metal particles. In certain examples, the metal particles can be silver particles, copper particles, zinc particles, nickel particles, or a combination thereof.

In other examples, the metal-containing microbe-inhibiting material can be in the form of elemental transition metal particles. The elemental transition metal particles can include, for example, silver particles, copper particles, gold particles, platinum particles, palladium particles, chromium particles, nickel particles, zinc particles, or combinations thereof. The particles can also include alloys of more than one transition metal, such as Au—Ag, Ag—Cu, Ag—Ni, Au—Cu, Au—Ni, Au—Ag—Cu, or Au—Ag—Pd.

In certain examples, other non-transition metals can be included in addition to the transition metal. The non-transition metals can include lead, tin, bismuth, indium, gallium, and others.

In certain examples, the metal particles can be nanoparticles having an average particle size from about 10 nm to about 200 nm. In more specific examples, the metal particles can have an average particle size from about 30 nm to about 70 nm. In other examples, larger particles can be used, such as particles having an average particle size from about 500 nm to about 5 μm, or from about 1 μm to about 5 μm.

In some examples, the metal particles, can be stabilized by a dispersing agent at surfaces of the particles. The dispersing agent can include ligands that passivate the surface of the particles. Some ligands can include a moiety that binds to the metal. Examples of such moieties can include sulfonic acid, phosphonic acid, carboxylic acid, dithiocarboxylic acid, phosphonate, sulfonate, thiol, carboxylate, dithiocarboxylate, amine, and others. In some cases, the dispersing agent can contain an alkyl group having from 3-20 carbon atoms, with one of the above moieties at an end of the alkyl chain. In certain examples, the dispersing agent can be an alkylamine, alkylthiol, or combination thereof. In further examples, the dispersing agent can be a polymeric dispersing agent, such as polyvinylpyrrolidone (PVP), polyvinylalcohol (PVA), polymethylvinylether, poly (acrylic acid) (PAA), nonionic surfactants, polymeric chelating agents, and others. The dispersing agent can bind to the surfaces of the metal particles through chemical and/or physical attachment. Chemical bonding can include a covalent bond, hydrogen bond, coordination complex bond, ionic bond, or combinations thereof. Physical attachment can include attachment through van der Waal's forces, dipole-dipole interactions, or a combination thereof.

The microbe-inhibiting agent can also include a liquid vehicle. In some examples, the liquid vehicle can include any of the liquid vehicle ingredients described above with respect to the fusing agent. For example, the liquid vehicle can include water, organic co-solvent, surfactant, anti-kogation agent, chelating agent, biocide, and so on. These can include any of the specific ingredients described above in the fusing agent. In certain examples, the microbe-inhibiting agent can include water and a polar aprotic solvent. In specific examples, the polar aprotic solvent can include 1-methyl-2-pyrrolidone, 2-pyrrolidone, 1-(2-hydroxyethyl)-2-pyrrolidone, dimethylformamide, dimethylsulfoxide, or combinations thereof. In further examples, the microbe-inhibiting agent can include a thiol surfactant. The thiol surfactant can include dodecanethiol, 1-undecanethiol, 2-ethylhexanethiol, 1-octanethiol, 1-tetradecanethiol, or combinations thereof.

Definitions

It is noted that, as used in this specification and the appended claims, the singular forms "a," "an," and "the" include plural referents unless the context clearly dictates otherwise.

As used herein, "colorant" can include dyes and/or pigments.

As used herein, "dye" refers to compounds or molecules that absorb electromagnetic radiation or certain wavelengths thereof. Dyes can impart a visible color to an ink if the dyes absorb wavelengths in the visible spectrum.

As used herein, "pigment" includes pigment colorants, magnetic particles, aluminas, silicas, and/or other ceramics, organo-metallics or other opaque particles, whether or not such particulates impart color. Thus, though the present description primarily describes the use of pigment colorants, the term "pigment" can be used to describe pigment colorants and other pigments such as organometallics, ferrites, ceramics, etc.

As used herein, "applying" when referring to a fluid agent that may be used, for example, refers to any technology that can be used to put or place the fluid, e.g., fusing agent, detailing agent, coloring agent, or the like on the polymeric build material or into a layer of polymeric build material for forming a three-dimensional object. For example, "applying" may refer to a variety of dispensing technologies, including "jetting," "ejecting," "dropping," "spraying," or the like.

As used herein, "ink jetting" or "jetting" refers to compositions that are ejected from jetting architecture, such as ink-jet architecture. Ink-jet architecture can include thermal or piezo architecture. Additionally, such architecture can be configured to print varying drop sizes such as less than 10 picoliters, less than 20 picoliters, less than 30 picoliters, less than 40 picoliters, less than 50 picoliters, etc.

As used herein, "average particle size" refers to a number average of the diameter of the particles for spherical particles, or a number average of the volume equivalent sphere diameter for non-spherical particles. The volume equivalent sphere diameter is the diameter of a sphere having the same volume as the particle. Average particle size can be measured using a particle analyzer such as the MASTERSIZER™ 3000 available from Malvern Panalytical (United Kingdom). The particle analyzer can measure particle size using laser diffraction. A laser beam can pass through a sample of particles and the angular variation in intensity of light scattered by the particles can be measured. Larger particles scatter light at smaller angles, while small particles scatter light at larger angles. The particle analyzer can then analyze the angular scattering data to calculate the size of the particles using the Mie theory of light scattering. The particle size can be reported as a volume equivalent sphere diameter.

As used herein, the term "substantial" or "substantially" when used in reference to a quantity or amount of a material, or a specific characteristic thereof, refers to an amount that is sufficient to provide an effect that the material or characteristic was intended to provide. The exact degree of deviation allowable may in some cases depend on the specific context. When using the term "substantial" or "substantially" in the negative, e.g., substantially devoid of a material, what is meant is that from none of that material is present, or at most, trace amounts could be present at a concentration that would not impact the function or properties of the composition as a whole.

As used herein, the term "about" is used to provide flexibility to a numerical range endpoint by providing that a given value may be "a little above" or "a little below" the endpoint. The degree of flexibility of this term can be dictated by the particular variable and determined based on the associated description herein.

As used herein, a plurality of items, structural elements, compositional elements, and/or materials may be presented in a common list for convenience. However, these lists should be construed as though individual members of the list are individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include the numerical values explicitly recited as the limits of the range, and also to include individual numerical values or sub-ranges encompassed within that range as if individual numerical values and sub-ranges are explicitly recited. As an illustration, a numerical range of "about 1 wt % to about 5 wt %" should be interpreted to include the explicitly recited values of about 1 wt % to about 5 wt %, and also include individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting a single numerical value. Furthermore, such an interpretation should apply regardless of the breadth of the range or the characteristics being described.

EXAMPLES

The following illustrates examples of the present disclosure. However, it is to be understood that the following are merely illustrative of the application of the principles of the present disclosure. Numerous modifications and alternative devices, methods, and systems may be devised without departing from the spirit and scope of the present disclosure. The appended claims are intended to cover such modifications and arrangements.

Example 1—Microbe-Inhibiting Agent Formulations

Two example microbe-inhibiting agents were formulated (Agent A and Agent B). Agent A included silver nanoparticles as the metal-containing microbe-inhibiting material. The concentration of silver nanoparticles in Agent A was about 22.8 wt % with respect to the total weight of Agent A. Other ingredients in Agent A included water, organic co-solvent, surfactant, anti-kogation agent, and biocide. Agent B included a metal bis(dithiolene) complex as the metal-containing microbe-inhibiting material in a concentration of about 0.5 wt %. Other ingredients in Agent B included water, organic co-solvent, surfactant, anti-kogation agent, biocide, and a light stabilizer.

A fusing agent was also prepared, without a metal-containing microbe-inhibiting material. The fusing agent included carbon black as an electromagnetic radiation absorber.

Example 2—Microbe Inhibition

The microbe-inhibiting agents A and B and the fusing agent from Example 1 were used to make a series of sample three-dimensional printed squares having dimensions of 32 mm by 32 mm by 5 mm thick. The design of the three-dimensional printed objects included a square-shaped volume of 30 mm by 30 mm with a thickness of 0.5 mm, in which volume the microbe-inhibiting agents were applied during three-dimensional printing. Agent A was applied in an amount that provided a total amount of silver nanoparticles of 8.8 vol % in the 30 mm by 30 mm by 0.5 mm volume of the object. Agent B was applied in an amount such that the total amount of the metal bis(dithiolene) complex was 1.3 vol % in the 30 mm by 30 mm by 0.5 mm volume of the object. The remainder of the objects were made with fusing agent, without any microbe-inhibiting agent. For comparison, control objects were also made with the same dimensions, but without any microbe-inhibiting agent.

The sample three-dimensional printed objects were then tested for bacteria growth using a testing protocol based on Japanese Industrial Standard JISZ2801. The protocol began by coating the objects with 0.4 mL of *E. coli* at a concentration of $8\times10^5$ colony forming units (CFU) per mL suspended in nutrient broth. The sample objects were then covered with parafilm to ensure uniform coating of the objects. One set of the objects (the test group) was placed in a humidity-controlled oven at 37° C. and 93% relative humidity to incubate for 24 hours. Another set of sample objects (the positive control group) was immediately transferred to a bag containing 10 mL of nutrient broth. The bag was massaged to ensure transfer of the coating into the nutrient broth. Then, 50 µL of this mixture was transferred to nutrient agar plates (in triplicate). The agar plates were incubated at 37° C. for 24 hours and then colonies were counted. Returning to the test group of sample objects, after the test group objects had incubated for 24 hours, the objects were also transferred to a bag of nutrient broth and massaged to remove the coated material from the objects. An aliquot was taken from the bag and a $10^3$-fold dilution was made. 50 µL of the diluted solution was transferred to nutrient agar plates (in triplicate). The agar plates were then incubated at 37° C. for 24 hours and colonies were counted. The solution from the test group was diluted in order to keep the number of colonies small enough to count.

The positive control group showed similar numbers of colonies on the objects made with Agent A, Agent B, and fusing agent alone. This was expected because the positive control group did not have time for the bacteria to grow on the sample objects. The number of colonies was about 300-450 colonies per plate. This number of colonies in 50 µL of fluid corresponds to about 6000-9000 CFU/mL. This is about a four-fold difference from the about 3.2 CFU/mL that is estimated from applying 0.4 mL of $8\times10^5$ CFU/mL *E. coli* to the object. It is assumed that the transfer of *E. coli* to the object was completed successfully and that the 4-fold difference is likely from the estimates of colony count.

The test group objects demonstrated the difference in biological suppression between Agent A, Agent B, and fusing agent. The objects made with fusing agent alone had about 197 colonies per plate. The objects made with Agent B had about 29 colonies per plate. This indicates a significant drop in bacterial viability with Agent B. The objects made with Agent A had 0 colonies observed. It is possible that bacteria were present in the agar plates for the solution from the Agent A objects in small, undetectable numbers. However, the lack of observable colonies indicates that Agent A provided more than a 100-fold drop in bacterial viability compared to the objects made with fusing agent alone.

Example 3—Varying Concentration of Silver Nanoparticles

Additional sample three-dimensional printed objects were made using Agent A, and the amount of Agent applied during three-dimensional printing was varied to test the microbe-inhibition properties at varying concentrations of silver nanoparticles in the three-dimensional printed objects. As explained above, when Agent A was applied in an amount that provided 8.8 vol % of silver nanoparticles in the three-dimensional printed object, a 1000-fold dilution of the 10 mL broth mixed with bacteria on the object surface yielded zero observable colonies on the agar plate. The same protocol was followed with a three-dimensional printed object that had 6.6 vol % of the silver nanoparticles and another object that had 4.8 vol % of the silver nanoparticles. Both of these objects produced the same results, with zero observable colonies on the agar plate.

Another set of experiments was also performed with objects made having silver nanoparticle concentrations of 4.8 vol %, 2.4 vol %, 1.3 vol %, and 0.32 vol %. A control object was made of pure polyamide-12 polymer by casting, without any fusing agent or microbe-inhibiting agent. The objects were all coated with a solution of *E. coli* as in the previous experiment. In this set of experiments, a positive control group of objects at the various silver concentration levels was placed in a bag with 10 mL of nutrient broth and then a 50 µL sample of the broth was transferred to an agar plate without any dilution. Because no colonies were observed in the previous experiments when the sample was diluted by 1000-fold, this set of experiments was performed without dilution to see if more colonies could be counted. For all of the positive control group objects, the number of colonies on the agar plate was about $5\text{-}7\times10^4$. The test group objects were allowed to incubate for 24 hours with the bacteria on the objects, and then the test group objects were placed in 10 mL bags of nutrient broth and a 50 µL sample was transferred to agar plates without dilution. For the test group, the pure polyamide-12 object yielded a large increase in colonies, with about 107 colonies being observed. The objects that included silver nanoparticles (in concentrations of 4.8 vol %, 2.4 vol %, 1.3 vol %, and 0.32 vol %) all yielded about the same result, with the number of colonies being about $2\text{-}6\times10^4$.

These results indicate that the silver nanoparticle-based microbe-inhibiting agent has the capability of actively killing bacteria to reduce the number of bacteria on the object over time. It is expected that there is a certain threshold concentration at which the silver nanoparticles become bactericidal. Below the threshold the three-dimensional printed object may be bacteriostatic, meaning that the growth of bacteria is prevented but the bacteria present on the object are not actively killed. Above the threshold, the silver nanoparticles can actively kill bacteria on the surface of the object to reduce the number of bacteria.

What is claimed is:

1. A method of making a three-dimensional printed object having anti-microbial properties, the method comprising:

iteratively applying a particulate build material to a powder bed to form individual particulate build material layers, wherein the particulate build material includes polymer particles;

based on a three-dimensional object model, selectively applying a fusing agent onto the individual particulate build material layers, wherein the fusing agent includes:

water; and an electromagnetic radiation absorber selected from the group consisting of carbon black, a tungsten bronze, a molybdenum bronze, a conjugated polymer, and a combination thereof;

based on the three-dimensional object model, selectively applying a microbe-inhibiting agent that is separate from the fusing agent onto the individual particulate build material layers in a sufficient amount to form an area having inhibited microbe growth, wherein the microbe-inhibiting agent consists of:

a metal-containing microbe-inhibiting material selected from the group consisting of silver particles, copper particles, zinc particles, nickel particles, a metal bis(dithiolene) complex, and a combination thereof; and a liquid vehicle consisting of water, a polar aprotic co-solvent, a thiol surfactant, an anti-kogation agent, and a biocide;

exposing the powder bed to energy to selectively fuse the polymer particles in contact with the electromagnetic radiation absorber to form a fused polymer matrix at individual build material layers.

2. The method of claim 1, wherein the metal bis(dithiolene) complex includes a metal selected from the group consisting of nickel, zinc, platinum, palladium, and molybdenum.

3. The method of claim 1, wherein the polymer particles are selected from the group consisting of polyamide-6 particles, polyamide-9 particles, polyamide-11 particles, polyamide-12 particles, polyamide-6,6 particles, polyamide-6,12 particles, thermoplastic polyamide particles, polyamide copolymer particles, polyethylene particles, thermoplastic polyurethane particles, polypropylene particles, polyester particles, polycarbonate particles, polyether ketone particles, polyacrylate particles, polystyrene particles, polyvinylidene fluoride particles, polyvinylidene fluoride copolymer particles, poly (vinylidene fluoride-trifluoroethylene) particles, poly (vinylidene fluoride-trifluoroethylene-chlorotrifluoroethylene) particles, wax particles, and a combination thereof.

4. The method of claim 1, wherein the sufficient amount of the metal-containing microbe-inhibiting material selectively applied to the individual particulate build material layers does not make the three-dimensional printed object electrically conductive.

5. The method of claim 1, wherein the sufficient amount of the metal-containing microbe-inhibiting material selectively applied to the individual particulate build material ranges from about 0.01 vol % to about 9 vol % with respect to a combined volume of the metal-containing microbe-inhibiting material and the particulate build material at the area.

6. The method of claim 1, wherein having inhibited microbe growth includes slowing microbe growth, preventing microbe growth, killing microbes present on the three-dimensional printed object, or a combination thereof.

7. The method of claim 1, wherein the area having inhibited microbe growth is a portion of a surface of the three-dimensional printed object, and wherein the three-dimensional printed object also includes a remainder of the surface that is devoid of the metal-containing microbe-inhibiting material.

8. The method of claim 1, wherein the metal-containing microbe-inhibiting material of the microbe-inhibiting agent includes silver nanoparticles.

9. The method of claim 1, wherein the metal-containing microbe-inhibiting material is selected from the group consisting of silver particles, copper particles, zinc particles, nickel particles, and a combination thereof, and wherein the metal-containing microbe-inhibiting material has an average particle size of from about 10 nm to about 200 nm.

10. The method of claim 8, wherein the silver nanoparticles have an average particle size ranging from about 10 nm to about 200 nm.

11. A method of making a three-dimensional printed object having anti-microbial properties, the method comprising:

iteratively applying a particulate build material to a powder bed to form individual particulate build material layers, wherein the particulate build material includes polymer particles;

based on a three-dimensional object model, selectively applying a fusing agent onto the individual particulate build material layers, wherein the fusing agent includes water and an electromagnetic radiation absorber, and wherein the fusing agent does not include a metal-containing microbe-inhibiting material;

based on the three-dimensional object model, selectively applying a microbe-inhibiting agent that is separate from the fusing agent onto the individual particulate build material layers in a sufficient amount to form an area having inhibited microbe growth, wherein the microbe-inhibiting agent consists of:

a liquid vehicle consisting of water, a polar aprotic co-solvent, a thiol surfactant, an anti-kogation agent, and a biocide; and the metal-containing microbe-inhibiting material selected from the group consisting of silver particles, copper particles, zinc particles, nickel particles, and a combination thereof; and exposing the powder bed to energy to selectively fuse the polymer particles in contact with the electromagnetic radiation absorber to form a fused polymer matrix at individual build material layers.

* * * * *